(12) United States Patent
Takeuchi et al.

(10) Patent No.: US 10,408,509 B2
(45) Date of Patent: Sep. 10, 2019

(54) ADSORBER

(71) Applicant: DENSO CORPORATION, Kariya, Aichi-pref. (JP)

(72) Inventors: Shinsuke Takeuchi, Kariya (JP); Hisao Nagashima, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 88 days.

(21) Appl. No.: 15/021,058

(22) PCT Filed: Sep. 10, 2014

(86) PCT No.: PCT/JP2014/004669
§ 371 (c)(1),
(2) Date: Mar. 10, 2016

(87) PCT Pub. No.: WO2015/037236
PCT Pub. Date: Mar. 19, 2015

(65) Prior Publication Data
US 2016/0223229 A1 Aug. 4, 2016

(30) Foreign Application Priority Data
Sep. 13, 2013 (JP) .................................. 2013-190643

(51) Int. Cl.
*F28D 7/10* (2006.01)
*F28F 1/08* (2006.01)
(Continued)

(52) U.S. Cl.
CPC .............. *F25B 35/04* (2013.01); *F25B 17/08* (2013.01); *F28D 7/103* (2013.01); *F28D 7/16* (2013.01);
(Continued)

(58) Field of Classification Search
CPC .......... F25B 35/04; F25B 17/08; F28D 7/103; F28D 7/16; F28D 20/00; F28F 1/08;
(Continued)

(56) References Cited

U.S. PATENT DOCUMENTS 3,108,908 A * 10/1963 Krebs .................... H01M 10/34
429/162
4,819,717 A * 4/1989 Ishikawa ............... C01B 3/0005
165/104.12
(Continued)

FOREIGN PATENT DOCUMENTS

CN 2556587 Y 6/2003
CN 202403597 U 8/2012
(Continued)

OTHER PUBLICATIONS

International Search Report and Written Opinion (in Japanese with English Translation) for PCT/JP2014/004669, dated Dec. 9, 2014; ISA/JP.

*Primary Examiner* — Frantz F Jules
*Assistant Examiner* — Martha Tadesse
(74) *Attorney, Agent, or Firm* — Harness, Dickey & Pierce, P.L.C.

(57) ABSTRACT

In an adsorber, a sintered body, which is formed by sintering metal powder particles, is joined to an outer surface of a heat medium tube, in which heat medium flows. An adsorbent is held by the sintered body. A groove is formed in an outer surface of the heat medium tube, and a groove is formed in an inner surface of the heat medium tube.

12 Claims, 8 Drawing Sheets

(51) Int. Cl.
  *F25B 35/04* (2006.01)
  *F28D 7/16* (2006.01)
  *F25B 17/08* (2006.01)

(52) U.S. Cl.
  CPC ............ *F28F 1/08* (2013.01); *F28F 2255/18* (2013.01); *Y02B 30/64* (2013.01)

(58) Field of Classification Search
  CPC ........ F28F 13/18; F28F 2255/18; F28F 23/00; Y02B 30/64
  See application file for complete search history.

(56) References Cited

U.S. PATENT DOCUMENTS

| | | | | |
|---|---|---|---|---|
| 5,308,703 | A * | 5/1994 | Tsujimoto | B01J 20/28033 |
| | | | | 428/186 |
| 7,810,352 | B2 * | 10/2010 | Mieda | F25B 35/04 |
| | | | | 62/476 |
| 8,079,409 | B2 * | 12/2011 | Ishimori | F28D 7/16 |
| | | | | 165/158 |
| 8,707,729 | B2 * | 4/2014 | Schmidt | F25B 35/04 |
| | | | | 62/476 |
| 2006/0175044 | A1 * | 8/2006 | Lee | F28D 15/046 |
| | | | | 165/104.26 |
| 2007/0095277 | A1 * | 5/2007 | Mieda | F25B 35/04 |
| | | | | 117/217 |
| 2008/0078532 | A1 * | 4/2008 | Nagashima | B22F 3/11 |
| | | | | 165/104.34 |
| 2011/0024098 | A1 * | 2/2011 | Lee | F28D 15/046 |
| | | | | 165/180 |
| 2012/0111541 | A1 * | 5/2012 | Yan | H01L 23/427 |
| | | | | 165/104.26 |

FOREIGN PATENT DOCUMENTS

| | | | | |
|---|---|---|---|---|
| DE | 3735915 | C2 | 2/1993 | |
| JP | 58052993 | A * | 3/1983 | ............ F28F 13/185 |
| JP | S60200063 | A | 10/1985 | |
| JP | H04148194 | A | 5/1992 | |
| JP | H04044602 | B2 | 7/1992 | |
| JP | H09-178382 | A | 7/1997 | |
| JP | H10185353 | A | 7/1998 | |
| JP | 2000016801 | A * | 1/2000 | ............ B01B 1/005 |
| JP | 2008107075 | A | 5/2008 | |
| JP | 2009198146 | A * | 9/2009 | |
| WO | WO-2013001390 | A1 | 1/2013 | |

* cited by examiner

COPPER PARTICLE

FIG. 9

RELATED ART

COPPER PARTICLE

RELATED ART

FIG. 16

ADSORBER

CROSS REFERENCE TO RELATED APPLICATIONS

This application is a U.S. National Phase Application under 35 U.S.C. 371 of International Application No. PCT/JP2014/004669 filed on Sep. 10, 2014 and published in Japanese as WO 2015/037236 A1 on Mar. 19, 2015. This application is based on and claims the benefit of priority from Japanese Patent Application No. 2013-190643 filed on Sep. 13, 2013. The entire disclosures of all of the above applications are incorporated herein by reference.

TECHNICAL FIELD

The present disclosure relates to an adsorber.

BACKGROUND ART

The Patent Literature 1 discloses an adsorber. This adsorber includes heat medium tubes, in which heat medium flows, a sintered body, which is porous and is joined to outer surfaces of the heat medium tubes, and an adsorbent, which is held by the sintered body. Smooth tubes, each of which does not have a groove in an inner surface and an outer surface of the tube, are used as the heat medium tubes. The sintered body is formed by sintering metal powder particles such that the metal powder particles are joined together while air gaps are formed among the metal powder particles, and the metal powder particles and the heat medium tubes are joined together. In this prior art adsorber, the adsorbent is held by the sintered body to improve the heat conductivity between the adsorbent and the heat medium tube.

The heat conductivity between the adsorbent and the heat medium, which flows in the heat medium tube, significantly contributes to an adsorption capacity of the adsorber at the time of adsorbing a gas phase refrigerant into the adsorbent or the time of desorbing the gas phase refrigerant from the adsorbent. Thus, it has been demanded to improve the heat conductivity between the adsorbent and the heat medium.

However, in the prior art adsorber discussed above, since the outer surface of the heat medium tube is smooth, the amount of contraction of the metal powder particles at the time of sintering the metal powder particles becomes large. In such a case, the metal powder particles largely move along a boundary between the metal powder particles and the heat medium tube. Thus, a process of joining between the metal powder particles and the outer surface of the heat medium tube is interfered, and thereby a contact surface area between the metal powder particles and the heat medium tube becomes small. As a result, a heat resistance between the metal powder particles and the heat medium tube disadvantageously becomes large. Furthermore, since the inner surface of the heat medium tube is smooth, a heat transfer coefficient between the heat medium and the heat medium tube becomes disadvantageously small.

CITATION LIST

PATENT LITERATURE 1: JP2008-107075A (corresponding to US2008/0078532A1)

SUMMARY OF INVENTION

Thus, it is an objective of the present disclosure to provide an adsorber that can improve heat conductivity at both of an inner side and an outer side of a heat medium tube in comparison to the prior art adsorber discussed above.

In order to achieve the above objective, an adsorber of the present disclosure includes:

a heat medium tube, through which heat medium flows;

a sintered body that is joined to an outer surface of the heat medium tube, wherein the sintered body is porous and is formed by sintering metal powder particles; and an adsorbent that is held by the sintered body, wherein:

a groove is formed in the outer surface of the heat medium tube, and a groove is formed in an inner surface of the heat medium tube.

Accordingly, since the groove is formed in the outer surface of the heat medium tube, it is possible to limit contraction of the metal powder particles at the time of sintering the metal powder particles in comparison to a case where the outer surface of the heat medium tube is smooth. Thus, the contact surface area between the metal powder particles and the heat medium tube can be increased, and thereby the heat resistance of the outer side of the heat medium tube can be reduced. Furthermore, since the groove is formed in the inner surface of the heat medium tube, the heat transfer surface area can be increased. Thereby, the heat transfer coefficient between the heat medium and the heat medium tube can be improved. As a result, according to the present disclosure, the heat conductivity can be improved at both of the inner side and the outer side of the heat medium tube.

DESCRIPTION OF EMBODIMENTS

Embodiments of the present disclosure will be described with reference to the accompanying drawings. In each of the following embodiments, the same or equivalent components are indicated by the same reference numerals.

(First Embodiment)

Figure 1:
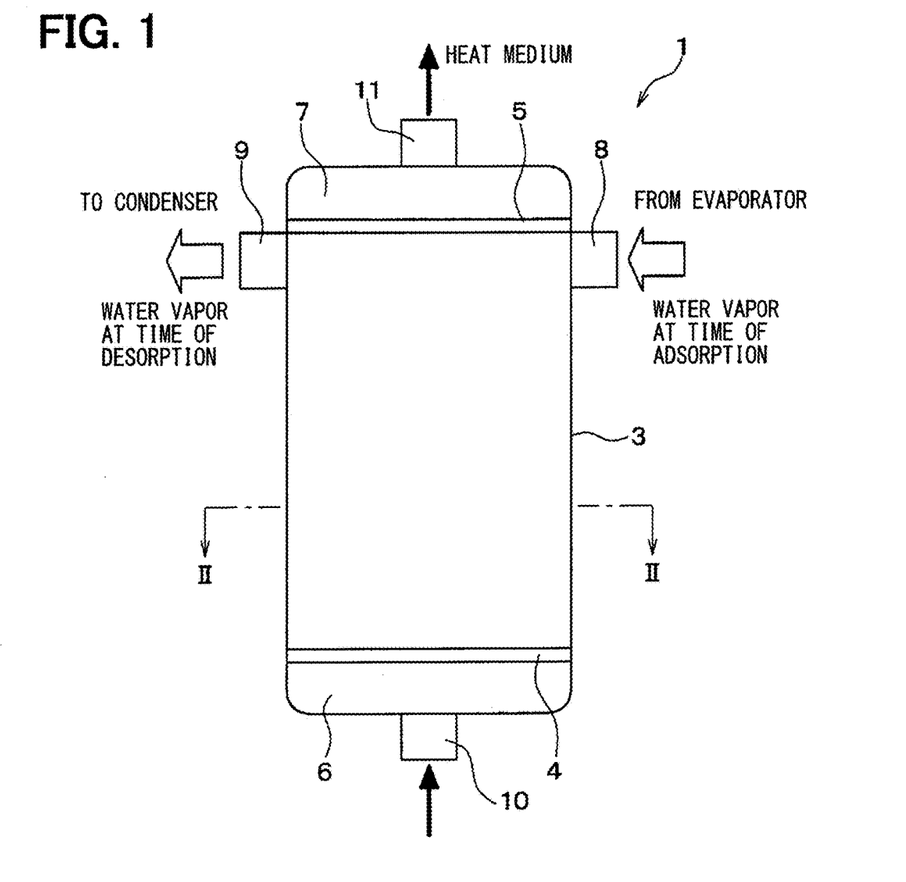
FIG. 1 is a front view of an adsorber according to a first embodiment of the present disclosure.
Figure 2:
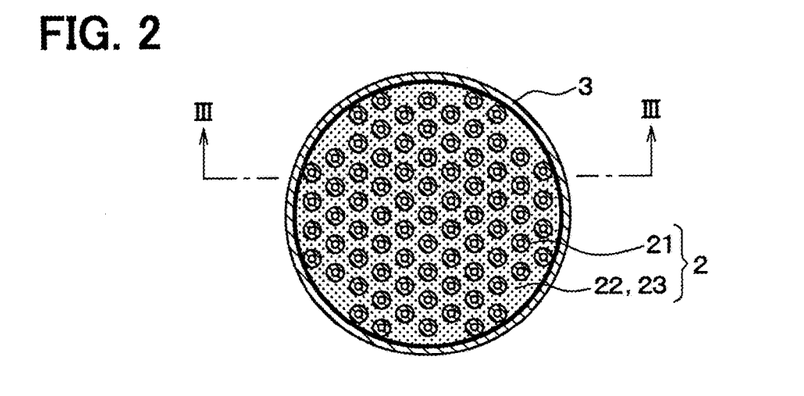
FIG. 2 is a cross sectional view taken along line II-II in FIG. 1.
Figure 3:
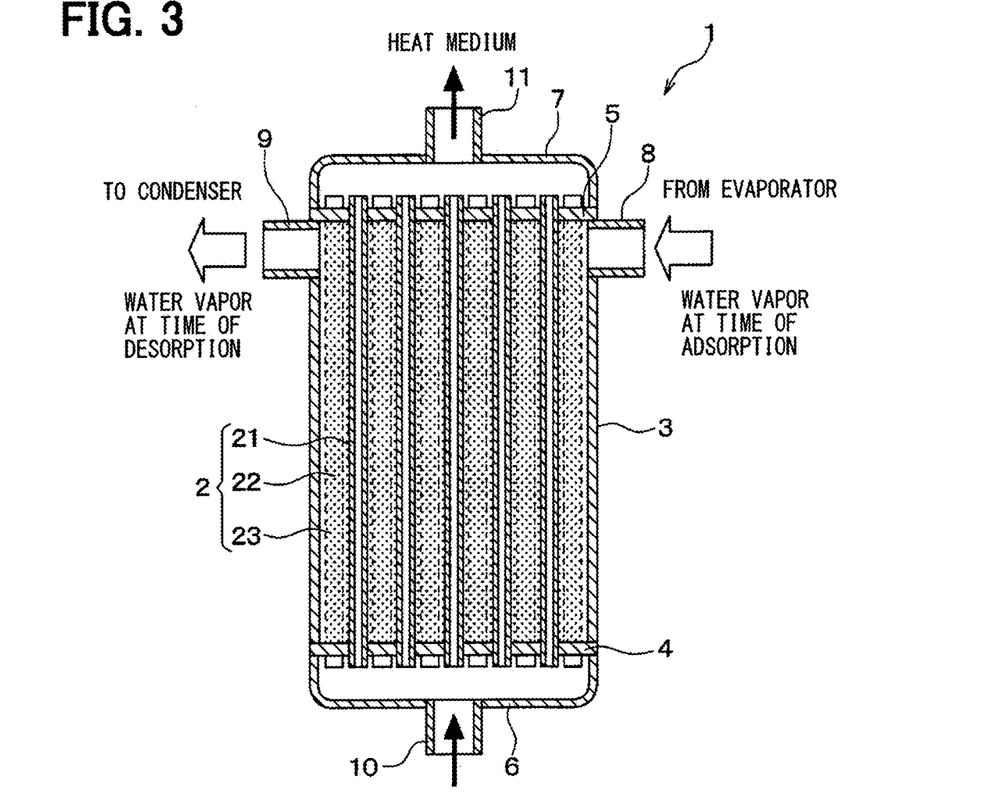
FIG. 3 is a cross-sectional view taken along line III-Ill in FIG. 2.

An adsorber of the present embodiment is applied to an air conditioning apparatus of, for example, a vehicle. As shown in FIGS. 1 to 3, the adsorber 1 includes an adsorbing and heat exchanging unit 2, a casing 3, first and second plates 4, 5, and first and second tanks 6, 7.

The adsorbing and heat exchanging unit 2 includes: a plurality of heat medium tubes 21, in which a heat medium, such as water, antifreeze or refrigerant, flows; a sintered body 22, which is porous and is joined to outer surfaces 21a of the heat medium tubes 21; and an adsorbent 23, which is held by the sintered body 22.

Each of the heat medium tubes 21 is a cylindrical tube having a circular cross section. The heat medium tubes 21 are spaced one after another at predetermined intervals and are parallel to each other. Each of the heat medium tubes 21 is made of metal, such as copper or a copper alloy, which has high heat conductivity. The sintered body 22 is placed around the respective heat medium tubes 21 and surrounds a radially outer side of the respective heat medium tubes 21.

Figure 4:
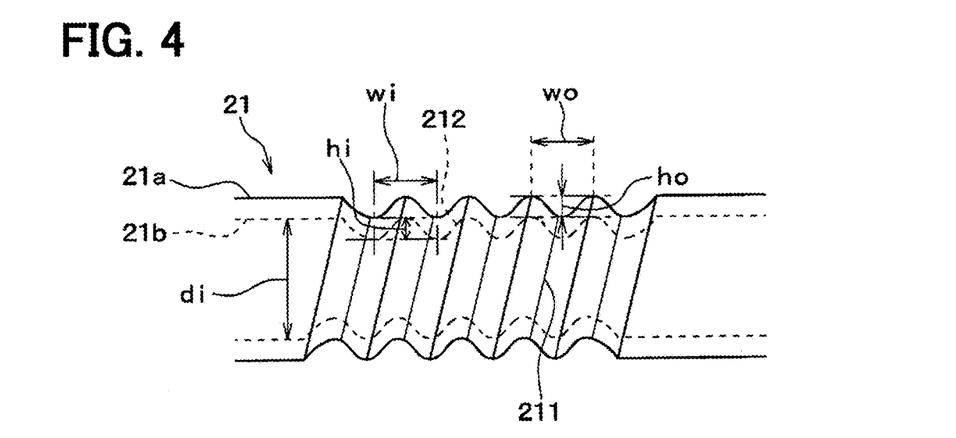
FIG. 4 is an external view showing a heat medium tube according to the first embodiment.

As shown in FIG. 4, each heat medium tube 21 includes a groove 211, 212 in both of an outer surface 21a and an inner surface 21b of the heat medium tube 21. In the present embodiment, each of the groove 211 of the outer surface 21a and the groove 212 of the inner surface 21b is a spiral groove and extends in a direction that crosses a longitudinal direction (axial direction) of the heat medium tube 21. The groove 211 of the outer surface 21a and the groove 212 of the inner surface 21b have an identical shape, an identical width wo, wi and an identical depth ho, hi.

As discussed later, the groove 211 of the outer surface 21a is for limiting contraction of metal powder particles 22a at the time of sintering the metal powder particles 22a. Thus, the width wo of the groove 211 of the outer surface 21a is set to a value that can limit the contraction of the sintered body 22 and is larger than a length of the metal powder particles 22a, which is measured before the time of sintering the metal powder particles 22a.

Figure 5:
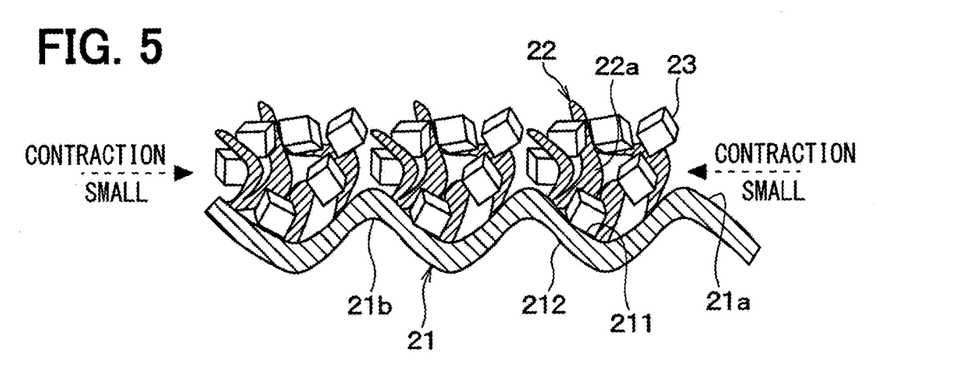
FIG. 5 is a schematic view showing a sintered body and an adsorbent placed in an outer surface of the heat medium tube according to the first embodiment.

As shown in FIG. 5, the sintered body 22 is formed by sintering the metal powder particles 22a such that the metal powder particles 22a are joined together while air gaps are formed among the metal powder particles 22a, and the metal powder particles 22a and the heat medium tubes 21 are joined together. Thereby, the sintered body has a three-dimensional mesh structure. The metal powder particles 22a, which form the sintered body 22, are made of metal, such as copper or a copper alloy, which has higher heat conductivity that is higher than that of the adsorbent 23. Furthermore, the metal powder particles 22a are respectively shaped into a fiber form.

The adsorbent 23 is in a solid form and adsorbs water vapor, which serves as a gas phase refrigerant. As shown in FIG. 5, the adsorbent 23 is placed in the air gaps of the sintered body 22. Thereby, the adsorbent 23 is in a form of particles, each of which has a grain size that is smaller than a size of the air gaps formed in the sintered body 22. The adsorbent 23 is, for example, silica gel or zeolite.

As shown in FIG. 2, the casing 3 receives the adsorbing and heat exchanging unit 2 therein. The casing 3 is shaped into a cylindrical tubular form having a lower end side opening and an upper end side opening. The lower end side opening and the upper end side opening are sealed with the first and second plates 4, 5, respectively.

A plurality of through holes is formed through each of the first and second plates 4, 5, and a corresponding one of the heat medium tubes 21 is insertable into each of the through holes. End portions of each heat medium tube 21 are respectively inserted into the corresponding one of the through holes of the first plate 4 and the corresponding one of the through holes of the second plate 5. Then, the heat medium tubes 21 are air-tightly joined to the first and second plates 4, 5. In this way, a space, which is located at the outside of the heat medium tubes 21, is formed as a sealed space by the casing 3 and the first and second plates 4, 5, and thereby a vacuum vessel is formed. This vacuum vessel is constructed such that another gas, which is other than the water vapor, does not exist in the inside of the vacuum vessel.

The first and second tanks 6, 7 are respectively formed as a tank for distributing the heat medium to the heat medium tubes 21 and a tank for collecting the heat medium from the heat medium tubes 21. An inflow tube 10 of the heat medium is formed in the first tank 6, which is placed at the lower side. An outflow tube 11 of the heat medium is formed in the second tank 7, which is placed at the upper side. Therefore, the heat medium, which is supplied into the first tank 6, flows through the heat medium tubes 21 and is outputted from the second tank 7.

An inflow tube 8 and an outflow tube 9 of the water vapor are formed at an upper portion of the casing 3. Therefore, at the time of adsorbing the water vapor, the water vapor flows from an evaporator into the inside of the casing 3 through the inflow tube 8. Furthermore, at the time of desorbing the water vapor, the water vapor, which is desorbed from the adsorbent 23, outflows from the outflow tube 9 to a condenser.

In the adsorber 1, which has the above-described structure, at the time of adsorbing the water vapor, the water vapor, which is formed through evaporation of the water in the evaporator, flows into the inside of the adsorber 1 and is adsorbed by the adsorbent 23. A vacuum state of the inside of the evaporator is maintained by the adsorbing of the water vapor by the adsorbent 23, and thereby the water can be kept evaporated in the inside of the evaporator. At this time, when the temperature of the adsorbent 23 becomes high, the adsorbing performance of the adsorbent 23 for adsorbing the water vapor is deteriorated. Therefore, the adsorbent 23 is cooled by a cooling heat medium, which flows in the heat medium tubes 21.

In contrast, at the time of desorbing the water vapor, a switching operating is performed such that a heating heat medium flows in the heat medium tubes 21. In this way, the heating heat medium, which flows in the heat medium tubes 21, heats the adsorbent 23. Thereby, the water vapor, which has been adsorbed by the adsorbent 23, is desorbed from the adsorbent 23. The water vapor, which is desorbed from the adsorbent 23, is condensed into the water at the condenser, and the condensed water is returned to the evaporator.

Next, a manufacturing method of the adsorber 1, which has the above-described structure, will be described.

Figure 6:
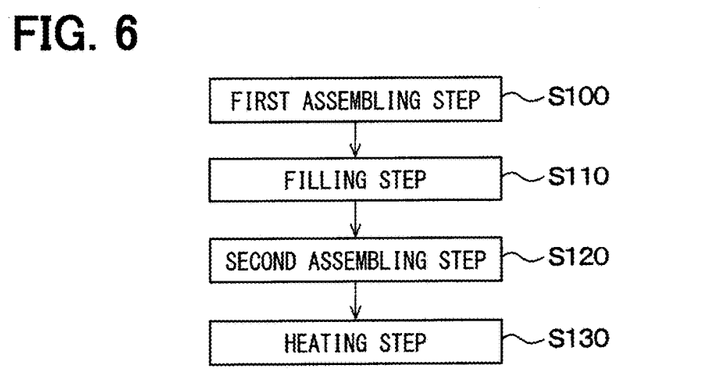
FIG. 6 is a flow chart showing manufacturing steps of the adsorber according to the first embodiment.

As shown in FIG. 6, a first assembling step S100, a filling step S110, a second assembling step S120 and a heating step S130 are sequentially performed in this order to manufacture the adsorber 1.

In the first assembling step S100, some of the components of the adsorber 1 are assembled. In this step, at least some of the components of the adsorbing and heat exchanging unit 2 except one of the first and second plates 4, 5 are assembled to the casing 3 to enable filling of the metal powder particles 22a at the next filling step S110.

At this time, the heat medium tubes 21, each of which has the spiral grooves 211, 212 in the outer surface 21a and the inner surface 21b, respectively, are used. A general processing method may be used as a method for forming the spiral grooves 211, 212. In the present embodiment, a mechanical force is applied to an outer surface of a smooth tube, so that the outer surface and an inner surface of the smooth tube are simultaneously deformed to form furrows and ridges in the outer surface and the inner surface of the smooth tube. In this way, the spiral grooves 211, 212 can be easily formed. When this processing method is used, the spiral grooves 211, 212, which are identically shaped, can be formed in the outer surface 21a and the inner surface 21b, respectively, of the heat medium tube 21.

Next, at the filling step S110, mixed powder particles of the metal powder particles 22a and the adsorbent 23 are filled at the outside of the respective heat medium tubes 21 in the inside of the casing 3.

Next, at the second assembling step S120, the remaining component(s) of the adsorber 1, which is other than those assembled in the first assembling step, is assembled.

Thereafter, at the heating step S130, the assembled adsorber 1 is heated, so that the components of the adsorber 1 are joined together by brazing, and the metal powder particles 22a are sintered. In this way, the metal powder particles 22a are joined together, and the metal powder particles 22a are also joined to the heat medium tubes 21. Thereby, the sintered body 22, which holds the adsorbent 23 in the inside thereof, is formed.

The manufacturing method of the adsorber 1 is not limited to the above-described manufacturing method, and the above-described manufacturing method may be changed. For example, instead of filling the mixed powder particles of the metal powder particles 22a and the adsorbent 23 in the inside of the casing 3 at the filling step S110, only the metal powder particles 22a may be filled in the inside of the casing 3. In such a case, after execution of the heating step S130, a step of filling a solution, which contains the adsorbent 23, into the inside of the casing 3 and a drying step may be performed, so that the adsorbent 23 is held by the sintered body 22. Furthermore, another step(s) may be added besides the above-described respective steps.

Next, advantages of the present embodiment will be described.

Figure 7:
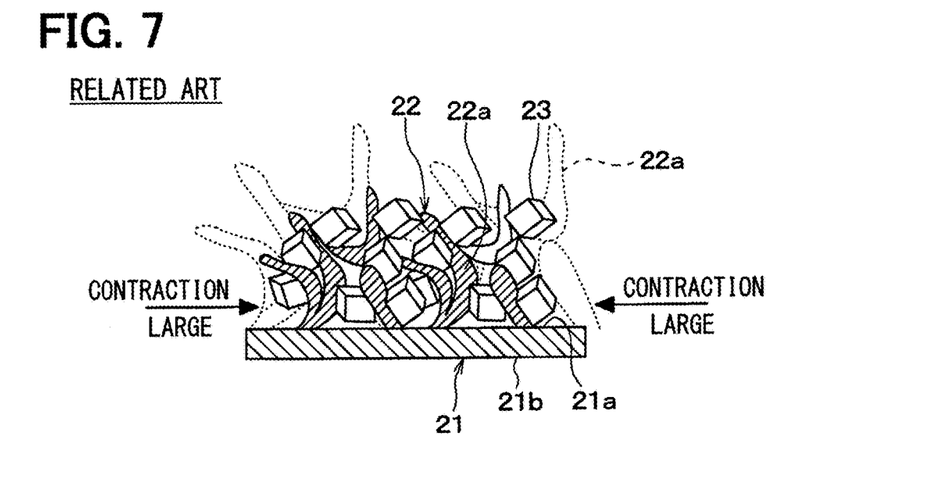
FIG. 7 is a schematic diagram showing a sintered body and an adsorbent placed in an outer surface of a heat medium tube in a first comparative example.

With reference to FIG. 7, in a first comparative example, in which smooth tubes are used as the heat medium tubes 21, when the outer surface 21a of each heat medium tube 21 is smooth, the amount of contraction of the metal powder particles 22a at the heating step S130 becomes large. In such an instance, the metal powder particles 22a substantially move along a boundary between the metal powder particles 22a and the heat medium tube 21. Thus, a process of joining between the metal powder particles 22a and the outer surface 21a of the heat medium tube 21 is interfered, and thereby a contact surface area between the metal powder particles 22a and the heat medium tube 21 becomes small. As a result, a heat resistance between the metal powder particles 22a and the heat medium tube 21 becomes large.

In contrast, as shown in FIG. 5, according to the present embodiment, the spiral groove 211 is formed in the outer surface 21a of each heat medium tube 21. The spiral groove 211 is a groove that is formed in the outer surface 21a of the heat medium tube 21 and extends in a direction that crosses the axial direction of the heat medium tube 21 (a direction that is not parallel to the axial direction of the heat medium tube 21). In other words, the spiral groove 211 spirally extends about the central axis of the heat medium tube 21. The multiple furrows and ridges (roots and crests) are arranged one after another in the axial direction of the heat medium tube 21 by the spiral groove 211 in the outer surface 21a of the heat medium tube 21. In this way, the contraction of the metal powder particles 22a in the axial direction of the heat medium tube 21 at the time of sintering can be limited in comparison to the case where the outer surface of the heat medium tube is smooth. Thus, the contact surface area between the metal powder particles 22a and the heat medium tube 21 can be increased, and thereby the heat resistance at the outer side of the heat medium tube 21 can be reduced. In the present embodiment, although the number of the spiral groove(s) 211, which is formed in the outer surface 21a of the heat medium tube 21, is one, the number of the spiral groove(s) 211, which is formed in the outer surface 21a of the heat medium tube 21, is not limited to one. That is, a plurality of spiral grooves 211 may be formed in the outer surface 21a of the heat medium tube 21. For example, the spiral grooves 211, each of which spirally extends about the central axis of the heat medium tube 21, may be arranged one after another in the axial direction in the outer surface 21a of the heat medium tube 21. Specifically, with reference to FIG. 4, another spiral groove, which is spaced from the spiral groove 211 shown in FIG. 4 on the right side or the left side of the spiral groove 211, may be formed in the outer surface 21a of the heat medium tube 21.

Furthermore, in the present embodiment, the spiral groove 212 is formed in the inner surface 21b of the heat medium tube 21 in a manner similar to that of the spiral groove 211 of the outer surface 21a. In this way, in comparison to the first comparative example of FIG. 7, in which the inner surface 21b of the heat medium tube 21 is smooth, according to the present embodiment, a heat transfer surface area can be increased, and an agitating action for agitating the heat medium can be generated by a spiral flow of the heat medium. Therefore, a heat transfer coefficient for transferring the heat between the heat medium, which flows in the heat medium tube 21, and the heat medium tube 21 can be improved. Furthermore, as discussed above with reference to the spiral groove 211 of the outer surface 21a of the heat medium tube 21, a plurality of spiral grooves may be formed in the inner surface 21b of the heat medium tube 21.

As a result, according to the present embodiment, the heat conductivity at both of the outer side and the inner side of the heat medium tube 21 can be improved, and thereby an adsorption capacity of the adsorber 1 can be improved.

Now, a result of an experiment, which is conducted by the inventors of the present application to check the advantages of the present embodiment, will be described.

(1) Reduction of Heat Resistance at Outer Side of Tube

A spirally grooved tube (hereinafter also simply referred to as a spirally grooved tube), which has a spiral groove in both of an inner surface and an outer surface thereof, and a smooth tube are prepared as heat medium tubes. The mixed powder particles of the metal powder particles and the adsorbent are placed at the outer surfaces of these heat medium tubes and are sintered. Here, the spirally grooved tube, which is used in this experiment, has an identically shaped groove in both of the outer surface and the inner surface of the spirally grooved tube. The spirally grooved tube and the smooth tube are copper tubes, and the metal powder particles are copper particles.

Figure 8:
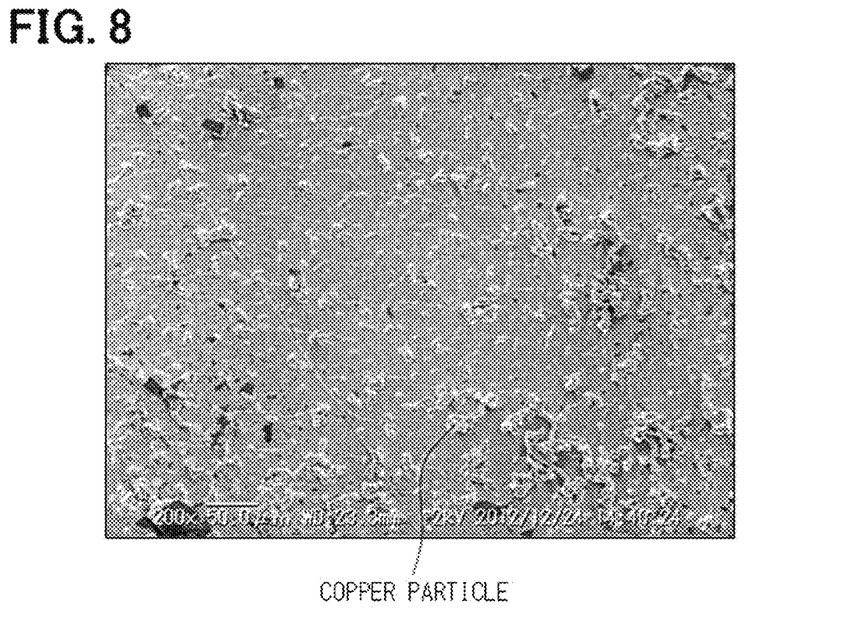
FIG. 8 is an SEM picture indicating joint parts, at each of which the heat medium tube and the sintered body of the first embodiment are joined.
Figure 9:
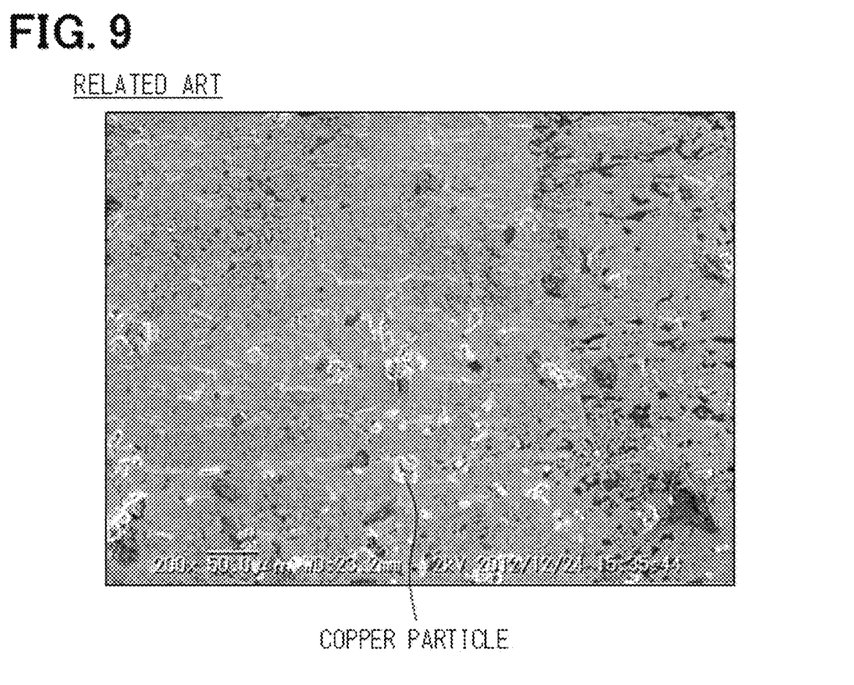
FIG. 9 is an SEM picture indicating joint parts, at each of which the heat medium tube and the sintered body of the first comparative example are joined.

Then, the sintered body, which is formed at the outer side of each of the heat medium tubes, is destroyed and is removed. Thereafter, the outer surface of each of the heat medium tubes is observed with a scanning electron microscope (SEM). In both of the outer surface of the spirally grooved tube shown in FIG. 8 and the outer surface of the smooth tube of the first comparative example of FIG. 9, the copper particles are present, and joint parts, which are joined to the sintered body, are recognized. Whitish particles shown in FIGS. 8 and 9 are the copper particles. The copper particles are joined to the heat medium tubes and are thereby left at the heat medium tubes without being removed. Thus, the locations of these copper particles are the joint parts between the heat medium tube and the sintered body.

As is understandable through comparison between FIG. 8 and FIG. 9, the number of the joint parts joined to the sintered body at the spirally grooved tube of FIG. 8 is larger than the number of the joint parts joined to the sintered body at the smooth tube of FIG. 9, so that the contact surface area between the sintered body and the spirally grooved tube of FIG. 8 is increased in comparison to the contact surface area between the sintered body and the smooth tube of FIG. 9. Thereby, when the spirally grooved tube, which has the spiral groove in both of the inner surface and the outer surface, is used, the heat resistance at the outer side of the tube can be reduced in comparison to the case where the smooth tube is used.

(2) Improvement of Heat Transfer Coefficient at Inner Side of Tube

The spirally grooved tube, which has the spiral groove in both of the inner surface and the outer surface thereof, and the smooth tube are prepared as the heat medium tubes. A heat transfer coefficient between the heat medium tube and the heat medium is measured by the Wilson plot method.

The table 1 indicates a tube inner diameter di of the smooth tube, a tube inner diameter di of the respective spirally grooved tubes, the number of spiral threads of the respective spirally grooved tubes, and a groove depth hi of the respective spirally grooved tubes. Each of the spirally grooved tubes has an identically shaped groove in both of the outer surface and the inner surface of the spirally grooved tube.

TABLE 1

|  | SMOOTH TUBE | SPIRALLY GROOVED TUBE | | | |
| --- | --- | --- | --- | --- | --- |
| TUBE INNER DIAMETER di (mm) | 3.64 | 3.64 | 3.64 | 3.64 | 3.64 |
| NUMBER OF THREADS | — | 3 | 3 | 3 | 3 |
| GROOVE DEPTH hi (mm) | — | 0.09 | 0.21 | 0.36 | 0.5 |
| hi/di | 0 | 0.025 | 0.058 | 0.099 | 0.137 |

In the measurement process, the Reynold's number (Re) of 500 and the Reynold's number (Re) of 1500 are used since a flow range used in a typical adsorber is a laminar flow range. As the measurement condition, the temperature of the cold water is set to be 30 degrees Celsius, and the temperature of the warm water is set to be 40 degrees Celsius. The smooth tube and the spirally grooved tubes, which are used in this measurement process, are in a state where the sintered body and the adsorbent are not provided to the outer side of the tube.

Figure 10:
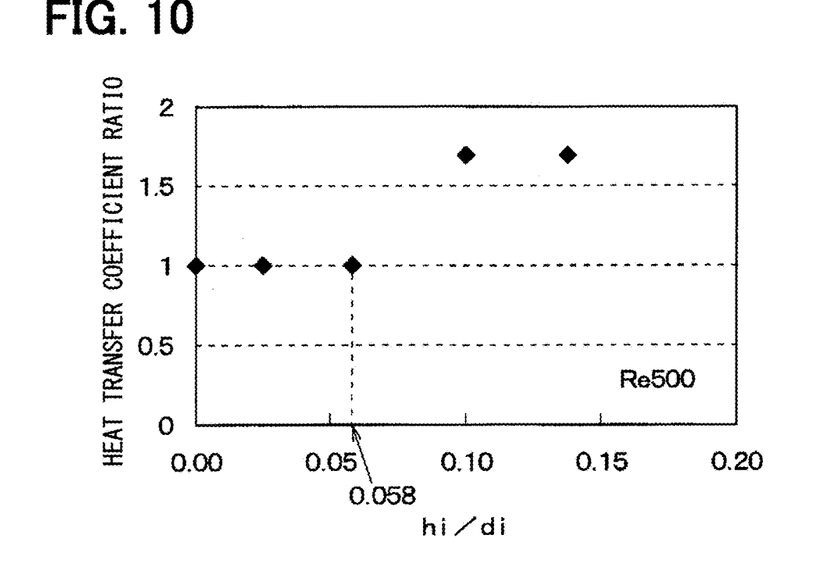
FIG. 10 is a diagram indicating a relationship between a ratio (hi/di) of a groove depth in an inner surface of the heat medium tube relative to an inner diameter of the heat medium tube according to the first embodiment, and a heat transfer coefficient ratio that is a ratio of a heat transfer coefficient of a spirally grooved tube of the first embodiment relative to a heat transfer coefficient of a smooth tube.
Figure 11:
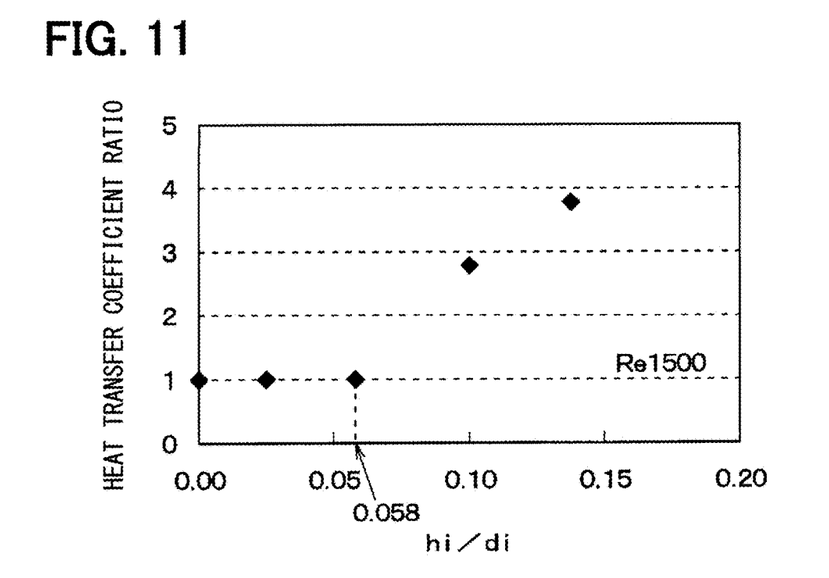
FIG. 11 is a diagram indicating a relationship between the ratio (hi/di) of the groove depth in the inner surface of the heat medium tube relative to the inner diameter of the heat medium tube according to the first embodiment, and a heat transfer coefficient ratio that is a ratio of a heat transfer coefficient of the spirally grooved tube of the first embodiment relative to a heat transfer coefficient of a smooth tube.

FIG. 10 indicates the measurement result of Re=500, and FIG. 11 indicates the measurement result of Re=1500. An axis of ordinates in FIGS. 10, 11 indicates a heat transfer coefficient ratio that is a ratio of a heat transfer coefficient of the spirally grooved tube relative to a heat transfer coefficient of the smooth tube. An axis of abscissas in each of FIGS. 10 and 11 indicates a ratio (hi/di) of a groove depth of the inner surface of the heat medium tube relative to an inner diameter of the heat medium tube, and a point of hi/di=0 along the axis of abscissas in each of FIGS. 10 and 11 corresponds to a value of hi/di of the smooth tube. A heat transfer coefficient at Re=500 in FIG. 10 is a heat transfer coefficient at the adsorbing time (the cooling time). A heat transfer coefficient at Re=1500 in FIG. 11 is a heat transfer coefficient at the desorbing time (the heating time). With reference to FIGS. 10 and 11, it is understood that when the value of hi/di is larger than 0.058 (i.e., hi/di>0.058), the heat transfer coefficient ratio exceeds 1, and the heat transfer coefficient of the spirally grooved tube is improved in comparison to the smooth tube.

(3) Improvement of Adsorption Capacity of Adsorber Through Improvement of Heat Transfer Coefficient at Inner Side of Tube An adsorption capacity ratio, which is a ratio of the adsorption capacity of the spirally grooved tube relative to the adsorption capacity of the smooth tube, is computed through an adsorption simulator while using the heat transfer coefficient ratio in the case of Re=500 shown in FIG. 10 and the heat transfer coefficient ratio in the case of Re=1500 shown in FIG. 11. Estimation values, which are obtained by first-order approximation of the heat transfer coefficient ratios shown in FIGS. 10 and 11, are used for the heat transfer coefficients in the range of hi/di>0.15. The result of this computation is obtained for the case where the porous sintered body is joined to the outer surfaces of the tubes, and the adsorbent is held in the inside of the sintered body. An identical value is used as a heat resistance value of the outer side of the spirally grooved tube, which has the spiral groove in both of the inner surface and the outer surface, and a heat resistance value of the outer side of the smooth tube. The heat resistance value of the outer side of the respective tubes used at this time is obtained in advance through an experiment.

Figure 12:
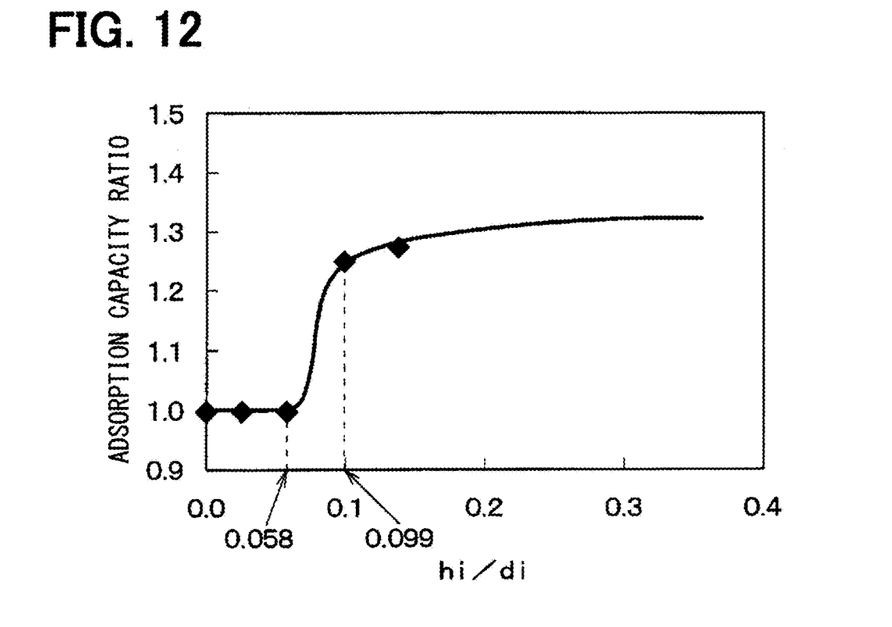
FIG. 12 is a diagram indicating a relationship between the ratio (hi/di) of the groove depth in the inner surface of the heat medium tube relative to the inner diameter of the heat medium tube according to the first embodiment, and an adsorption capacity ratio, which is a ratio of an adsorption capacity of the spirally grooved tube relative to an adsorption capacity of the smooth tube.

FIG. 12 shows the result of the computation. An axis of abscissas in FIG. 12 indicates the value of hi/di, and a point where hi/di=0 along the axis of abscissas in FIG. 12 corresponds to the value of hi/di of the smooth tube. As indicated in FIG. 12, when the value of hi/di is larger than 0.058 (i.e., hi/di>0.058), the adsorption capacity ratio exceeds 1. Furthermore, when the value of hi/di is equal to or larger than 0.099 (i.e., hi/di≥0.099), the adsorption capacity ratio exceeds 1.2. According to the above result, when the value of hi/di is larger than 0.058 (i.e., hi/di>0/058), the adsorption capacity of the spirally grooved tube is improved. Furthermore, when the value of hi/di is equal to or larger than 0.099 (i.e., hi/di≥0.099), the adsorption capacity of the spirally grooved tube is drastically improved. Therefore, with respect to the tube inner diameter di of the spirally grooved tube and the groove depth hi of the inner surface of the spirally grooved tube, it is desirable to satisfy the relationship of hi/di>0.058, and it is further desirable to satisfy the relationship of hi/di≥0.099.

Furthermore, as a second comparative case, an adsorption capacity ratio is computed through the adsorption simulator for each of an adsorber, in which only the adsorbent is placed at the outer side of the respective smooth tubes while the porous sintered body is not placed at the outer side of the respective smooth tubes, and an adsorber in which only the adsorbent is placed at the outer side of the respective spirally grooved tubes while the porous sintered body is not placed at the outer side of the respective spirally grooved tubes. At this time, similar to the result of the computation of FIG. 12, the heat transfer coefficient ratio in the case of Re=500 shown in FIG. 10 and the heat transfer coefficient ratio in the case of Re=1500 shown in FIG. 11 are used. Furthermore, a heat resistance value, which is obtained in the state where only the adsorbent is filled at the outer side of the respective tubes, is used as the heat resistance value of the outer side of the respective tubes. The heat resistance value of the outer side of the respective tubes used at this time is obtained in advance through an experiment.

Figure 13:
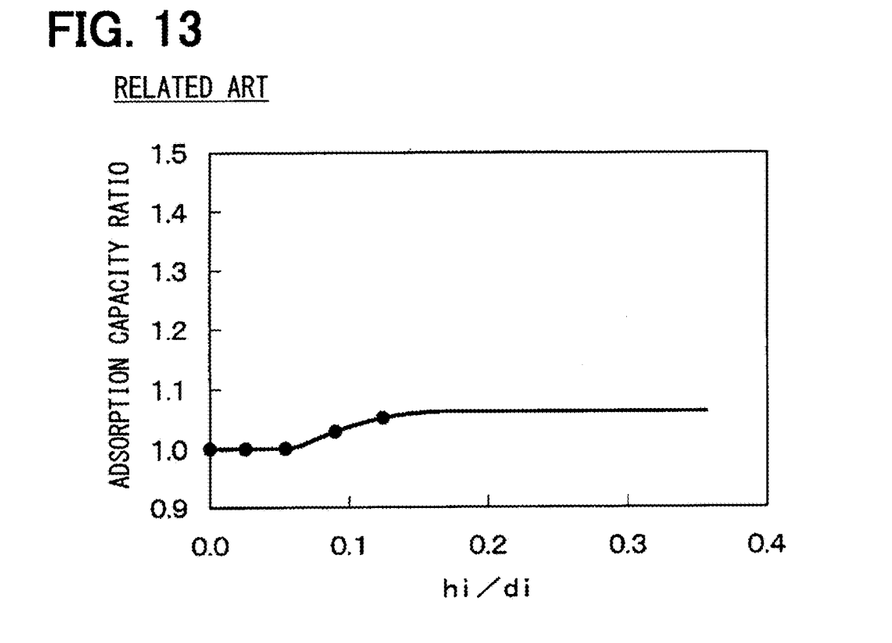
FIG. 13 is a diagram indicating a relationship between a ratio (hi/di) of a groove depth in an inner surface of a heat medium tube relative to an inner diameter of the heat medium tube according to a second comparative example, and an adsorption capacity ratio, which is a ratio of an adsorption capacity of the heat medium tube relative to an adsorption capacity of a smooth tube in the second comparative example.

As shown in FIG. 13, in the second comparative example, when the value of hi/di is larger than 0.058 (i.e., hi/di>0.058), the adsorption capacity ratio only slightly exceeds 1. As discussed above, in the case of the adsorber of the second comparative example, in which the porous sintered body is not placed at the outer sides of the tubes, the heat resistance value of the outer side of the tube is large. Therefore, even when the heat transfer is promoted at the inner sides of the tubes, it hardly contributes to the improvement of the adsorption capacity.

In contrast, in the case of the adsorber, in which the porous sintered body is joined to the outer surfaces of the tubes, since the heat resistance value of the outer side of each tube is small, the adsorption capacity is largely improved by the heat transfer promotion at the inner side of the tube. Therefore, the advantage of drastic improvement of the adsorption capacity, which is implemented by the heat transfer promotion of the spiral groove 212 formed in the inner surface 21b of the tube, is specific to the adsorber 1, in which the porous sintered body 22 is joined to the outer surface 21a of the respective tubes, and the adsorbent 23 is held in the inside of the sintered body 22.

As discussed above, the result of the computation of the adsorption capacity ratio shown in FIG. 12 is the result, which is obtained through use of the smooth tubes. In the case where the spirally grooved tube, which has the spiral groove in both of the inner surface and the outer surface thereof, the heat resistance of the outer side of the tube is reduced in comparison to the case where the smooth tube is used. Therefore, when the value of hi/di is equal to or larger than 0.099 (i.e., hi/di≥0.099), it is easily predicted that the adsorption capacity is further improved in comparison to the result shown in FIG. 12.

(4) Energy Saving Effect

As an index, which indicates the performance of the adsorber, there is a Coefficient of Performance (COP) that indicates the energy saving effect. The COP is computed through the following equation.

$$COP = Output/Heat\ Input = Adsorption\ Capacity/(Amount\ of\ Generated\ Heat + Heat\ Capacity)$$

The COP is computed based on the adsorption capacity, which serves as the output, and the amount of cold heat, which serves as the heat input required for implementing the adsorption capacity. When the amount of cold heat, which is required to implement the same adsorption capacity, becomes smaller, the energy saving effect becomes higher.

The amount of cold heat is the amount of cold heat, which is required to change the state of the adsorbent from the desorbing state (the heating state) to the adsorbing state (the cooling state). The amount of cold heat includes the amount of cold heat, which is required to cool the generated heat of the adsorbent at the adsorbing time, and the amount of cold heat, which is required to cool the heat capacity of the entire adsorber to change the heating state to the cooling state. Therefore, the COP is computed based on the adsorption capacity, the amount of heat generated from the adsorbent at the adsorbing time, and the heat capacity of the entire adsorber. The amount of heat generated from the adsorbent is obtained by multiplying the adsorption capacity by a predetermined coefficient and is thereby obtained based on the adsorption capacity. The heat capacity is obtained based on, for example, the weight of the heat medium tubes.

Figure 14:
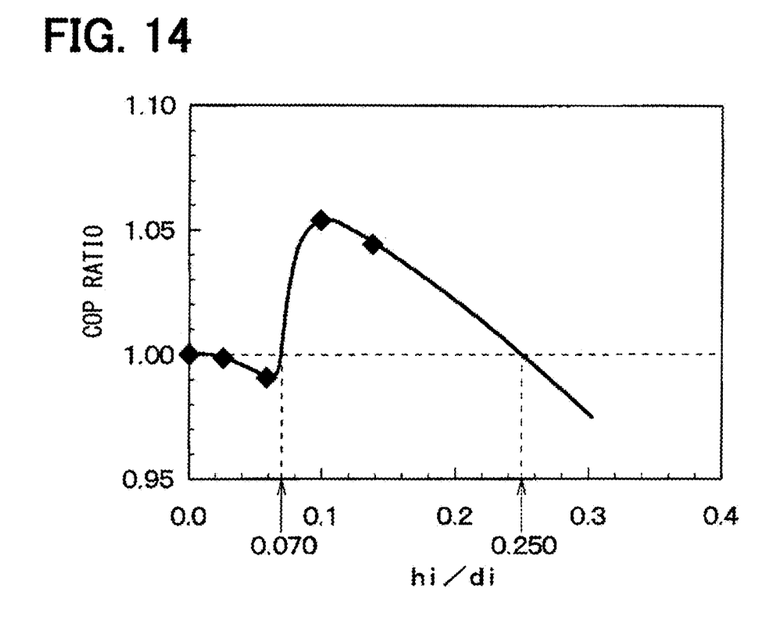
FIG. 14 is a diagram indicating a relationship between the ratio (hi/di) of the groove depth in the inner surface of the heat medium tube relative to the inner diameter of the heat medium tube according to the first embodiment, and a COP ratio, which is a ratio of a COP of the heat medium tubes of the first embodiment relative to a COP of the smooth tubes.

FIG. 14 indicates a result of computation of a COP ratio, which is a ratio of a COP of the spirally grooved tubes (i.e., the spirally grooved tubes, each of which has the spiral groove in both of the inner surface and the outer surface of tube) relative to the COP of the smooth tubes.

Figure 15:
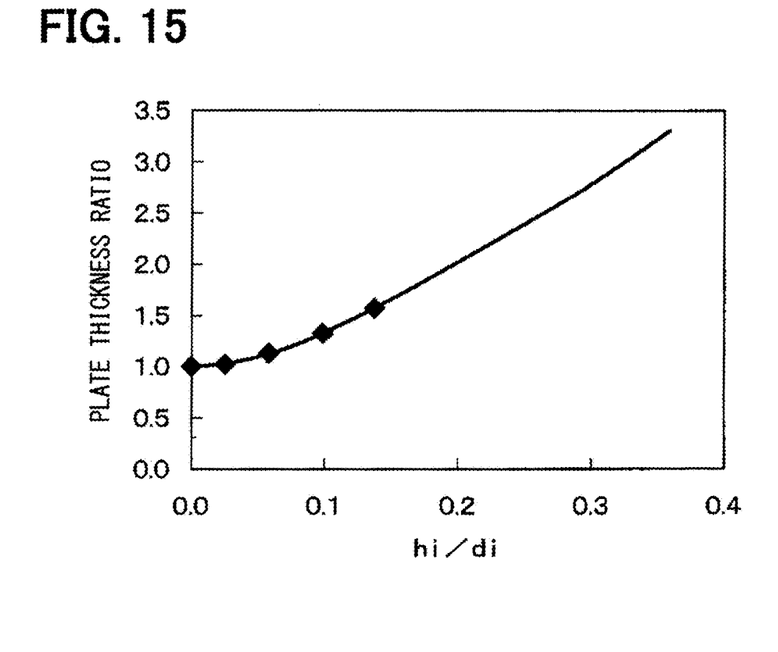
FIG. 15 is a diagram indicating a relationship between the ratio (hi/di) of the groove depth in the inner surface of the heat medium tube relative to the inner diameter of the heat medium tube according to the first embodiment, and a plate thickness ratio that is a ratio between a plate thickness of the smooth tube and a plate thickness of a smooth tube before the time of groove processing in the heat medium tube of the first embodiment.

According to the groove processing method of the present embodiment, the plate thickness of the processed portion of the plate is reduced. Therefore, in a case where the plate thickness of a smooth tube before the time of processing the smooth tube into the spirally grooved tube is identical for all of the tubes, the plate thickness of the tube after the groove processing is reduced when the depth of the groove is increased. In view of the above point, at the time of computing the COP ratio, the computation is made while the plate thickness of each of the spirally grooved tubes after the groove processing is set to be identical regardless of the groove depth. Specifically, as shown in FIG. 15, when the depth of the groove is increased, the plate thickness of the smooth tube before the groove processing thereof is increased to compensate a reduction in the plate thickness caused by the groove processing. A plate thickness ratio indicated at the axis of ordinates of FIG. 15 is a ratio between a plate thickness of the smooth tube and a plate thickness of the smooth tube before the time of groove processing in the spirally grooved tube. Therefore, in the case of the spirally grooved tube of the present embodiment, when the depth of the groove of the spirally grooved tube is increased, the weight of the heat medium tube is increased to cause an increase in the heat capacity. As is understood from the above equation, when the heat capacity is increased, the COP is deteriorated.

Therefore, as shown in FIG. 14, as a range of hi/di, there are two ranges, i.e., a range of hi/di, in which the COP ratio exceeds 1, and a range of hi/di, in which the COP ratio is smaller than 1. The range, in which the COP exceeds 1, is 0.070<hi/di<0.250. Therefore, desirably the tube inner diameter di and the groove depth hi of the inner surface of the spirally grooved tube, which has the spiral groove in both of the inner surface and the outer surface, are set to satisfy the relationship of 0.070<hi/di<0.250.

In FIG. 15, in the range of hi/di>0.099, when the value of hi/di is increased, the plate thickness ratio is linearly increased. Thus, it is predicted that the heat capacity is linearly increased in the range of hi/di>0.099 in FIG. 15. Furthermore, in FIG. 12, the adsorption capacity ratio is generally constant in the range of hi/di>0.099. Therefore, with respect to the relationship between the COP ratio and hi/di shown in FIG. 14, it is predicted that the COP ratio is linearly decreased when the value of hi/di is increased in the range of hi/di>0.099.

Furthermore, the experimental result discussed above is obtained for the case where the spirally grooved tubes, each of which has the identical groove shape in both of the outer surface and the inner surface, are used. Here, it is predicted that a similar experimental result, which is similar to the above result, is obtainable even in a case where spirally grooved tubes, each of which has different groove shapes in the outer surface and the inner surface, respectively, are used.

(Second Embodiment)

The present embodiment is a modification of the first embodiment, in which a direction of the respective grooves 211, 212 of each heat medium tube 21 is changed. The rest of the structure is the same as that of the first embodiment.

Figure 16:
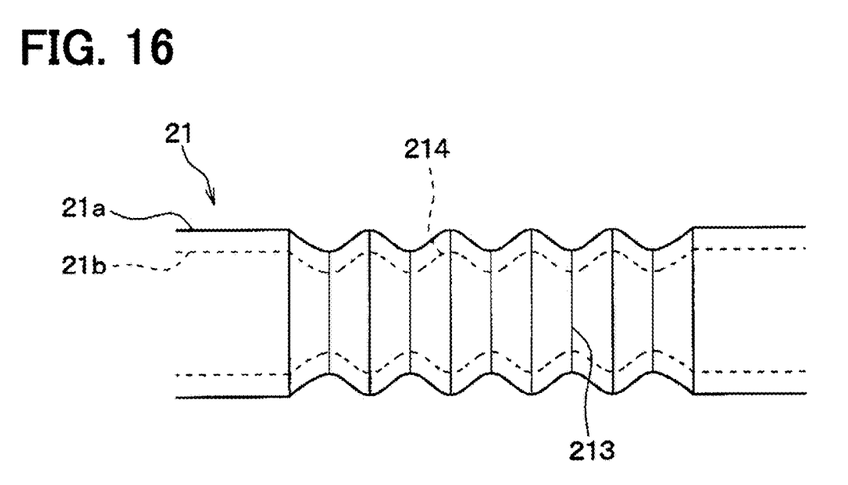
FIG. 16 is an external view of a heat medium tube according to a second embodiment of the present disclosure.

Specifically, as shown in FIG. 16, the present embodiment uses the heat medium tubes 21, each of which has the grooves 213, 314 that are arranged in a form of bellows and are formed in both of the outer surface 21*a* and the inner surface 21*b* of the heat medium tube 21. Each of the grooves 213, 214 extends in a direction that crosses the axial direction of the heat medium tube 21, more specifically in a direction perpendicular to the axial direction of the heat medium tube 21. Each heat medium tube 21 includes a plurality of these grooves 213, 214, which are arranged one after another in the axial direction of the heat medium tube 21. That is, the grooves 213, each of which extends in a circumferential direction of the heat medium tube 21, are arranged one after another in the axial direction in the outer surface 21*a* of the heat medium tube 21. Also, the grooves 214, each of which extends in the circumferential direction of the heat medium tube 21, are arranged one after another in the axial direction in the inner surface 21*b* of the heat medium tube 21. Therefore, it can be said that each of the grooves 213, 214 extends in the direction that crosses the axial direction of the heat medium tube 21 (more specifically, the direction that is perpendicular to the axial direction). Thus, even in the present embodiment, the advantages, which are similar to those of the first embodiment, can be achieved.

(Other Embodiments)

The present disclosure is not limited to the above embodiments, and the above embodiments may be appropriately modified within the scope of the present disclosure.

(1) The groove(s), which are formed in the outer surface 21*a* and the inner surface 21*b* of the heat medium tube 21, may be configured to extend in a direction that is parallel to the axial direction of the heat medium tube 21. In such a case, the contraction of the metal powder particles 22*a* in the circumferential direction of the heat medium tube 21 can be limited at the time of sintering the metal powder particles 22*a*. Thus, in comparison to the case where the outer surface 21*a* of each heat medium tube 21 is smooth, the contact surface area between the metal powder particles 22*a* and the heat medium tube 21 can be increased, and thereby the heat resistance of the outer side of the heat medium tube 21 can be reduced. Furthermore, even in such a case, in comparison to the case where the inner surface 21*b* of the heat medium tube 21 is smooth, the heat transfer surface area of the inner surface 21*b* of the heat medium tube 21 can be increased. Thereby, the heat transfer coefficient between the heat medium, which flows in the heat medium tube 21, and the heat medium tube 21 can be improved.

As a result, even in such a case, the heat conductivity at both of the outer side and the inner side of the heat medium tube 21 can be improved, and thereby the adsorbing performance of the adsorber 1 can be improved.

(2) The shape of the groove of the outer surface 21*a* and the shape of the groove of the inner surface 21*b* in the heat medium tube 21 are not necessarily identical to each other. However, it is desirable that the groove of the outer surface 21*a* and the groove of the inner surface 21*b* extend in a direction that crosses the axial direction of the heat medium tube 21. The amount of contraction of the metal powder particles 22*a* in the axial direction of the heat medium tube 21 is larger than the amount of contraction of the metal powder particles 22*a* in the circumferential direction of the heat medium tube 21. Thus, when the contraction of the metal powder particles 22*a* in the axial direction is limited by providing the groove, which extends in the direction that crosses the axial direction in the outer surface 21*a* of the heat medium tube 21, the effect of reducing the heat resistance of the outer side of the heat medium tube 21 can be enhanced. Furthermore, when the groove, which extends in the direction that crosses the axial direction, is formed in the inner surface 21*b* of the heat medium tube 21, not only the heat transfer surface area of the inner surface 21*b* of the heat medium tube 21 is increased, but also the agitating action for agitating the heat medium in the inside of the heat medium tube 21 can be achieved. Thus, the effect of improving the heat transfer coefficient ratio between the heat medium and the heat medium tube 21 is enhanced.

(3) The shape of each metal powder particles 22*a* is not limited to the fiber form. For example, as long as the metal powder particles 22*a* can form the porous sintered body, each metal powder particle may have any other shape, such as a sphere form.

(4) The gas phase refrigerant is not limited to the water vapor, and any other suitable gas phase refrigerant may be used as the gas phase refrigerant of the present disclosure.

(5) The above respective embodiments are not unrelated to each other. That is, in the above respective embodiments, the component(s) may be combined with the component(s) of any other embodiment(s) in an appropriate manner except a case where the combination is clearly impossible. Furthermore, in the above respective embodiments, it should be understood that the components are not necessarily indispensable except a case where the components are expressly stated as indispensable and a case where the components are regarded as indispensable in view of the principle.

What is claimed is:
1. An adsorber comprising:
a heat medium tube, through which heat medium flows;

a metal powder particle sinter that is joined to an outer surface of the heat medium tube, wherein the metal powder particle sinter is porous and includes joined metal powder particles, which are joined together; and an adsorbent that is held by the metal powder particle sinter, wherein:

a groove is formed in the outer surface of the heat medium tube, and a groove is formed in an inner surface of the heat medium tube, wherein the groove in the outer surface of the heat medium tube holds a corresponding portion of the metal powder particle sinter in an inside of the groove in the outer surface, and the joined metal powder particles of the corresponding portion of the metal powder particle sinter, which are other than the adsorbent, are joined to a recessed surface part of the groove in the outer surface.

2. The adsorber according to claim 1, wherein the groove of the outer surface and the groove of the inner surface are spiral grooves, respectively, which extend in a direction that crosses an axial direction of the heat medium tube.

3. The adsorber according to claim 2, wherein the groove of the inner surface satisfies a relationship of hi/di>0.058 where hi denotes a depth of the groove, and di denotes an inner diameter of the heat medium tube.

4. The adsorber according to claim 3, wherein the groove of the inner surface satisfies a relationship of hi/di>0.070.

5. The adsorber according to claim 4, wherein the groove of the inner surface satisfies a relationship of hi/di≥0.099.

6. The adsorber according to claim 2, wherein the groove of the inner surface satisfies a relationship of hi/di<0.250, where hi denotes a depth of the groove, and di denotes an inner diameter of the heat medium tube.

7. An adsorber comprising:

a heat medium tube, through which heat medium flows;

a metal powder particle sinter that is joined to an outer surface of the heat medium tube, wherein the metal powder particle sinter is porous and includes joined metal powder particles, which are joined together; and an adsorbent that is held by the metal powder particle sinter, wherein:

a plurality of grooves are formed in the outer surface of the heat medium tube and respectively extend in a direction that crosses an axial direction of the heat medium tube, and a plurality of grooves are formed in an inner surface of the heat medium tube and respectively extend in the direction that crosses the axial direction of the heat medium tube, wherein each of the plurality of grooves in the outer surface of the heat medium tube holds a corresponding portion of the metal powder particle sinter in an inside of the groove in the outer surface, and the joined metal powder particles of the corresponding portion of the metal powder particle sinter, which are other than the adsorbent, are joined to a recessed surface part of each of the plurality of grooves in the outer surface.

8. The adsorber according to claim 7, wherein the plurality of grooves of the outer surface and the plurality of grooves of the inner surface are spiral grooves, respectively, which extend in the direction that crosses the axial direction of the heat medium tube.

9. The adsorber according to claim 8, wherein each of the plurality of grooves of the inner surface satisfies a relationship of hi/di>0.058 where hi denotes a depth of the groove, and di denotes an inner diameter of the heat medium tube.

10. The adsorber according to claim 9, wherein each of the plurality of grooves of the inner surface satisfies a relationship of hi/di>0.070.

11. The adsorber according to claim 10, wherein each of the plurality of grooves of the inner surface satisfies a relationship of hi/di≥0.099.

12. The adsorber according to claim 8, wherein each of the plurality of grooves of the inner surface satisfies a relationship of hi/di<0.250, where hi denotes a depth of the groove, and di denotes an inner diameter of the heat medium tube.

* * * * *